April 19, 1966
S. D. POOL ETAL
3,246,715
HYDRAULIC PROPULSION DRIVE MECHANISM
Filed March 3, 1964
9 Sheets-Sheet 1
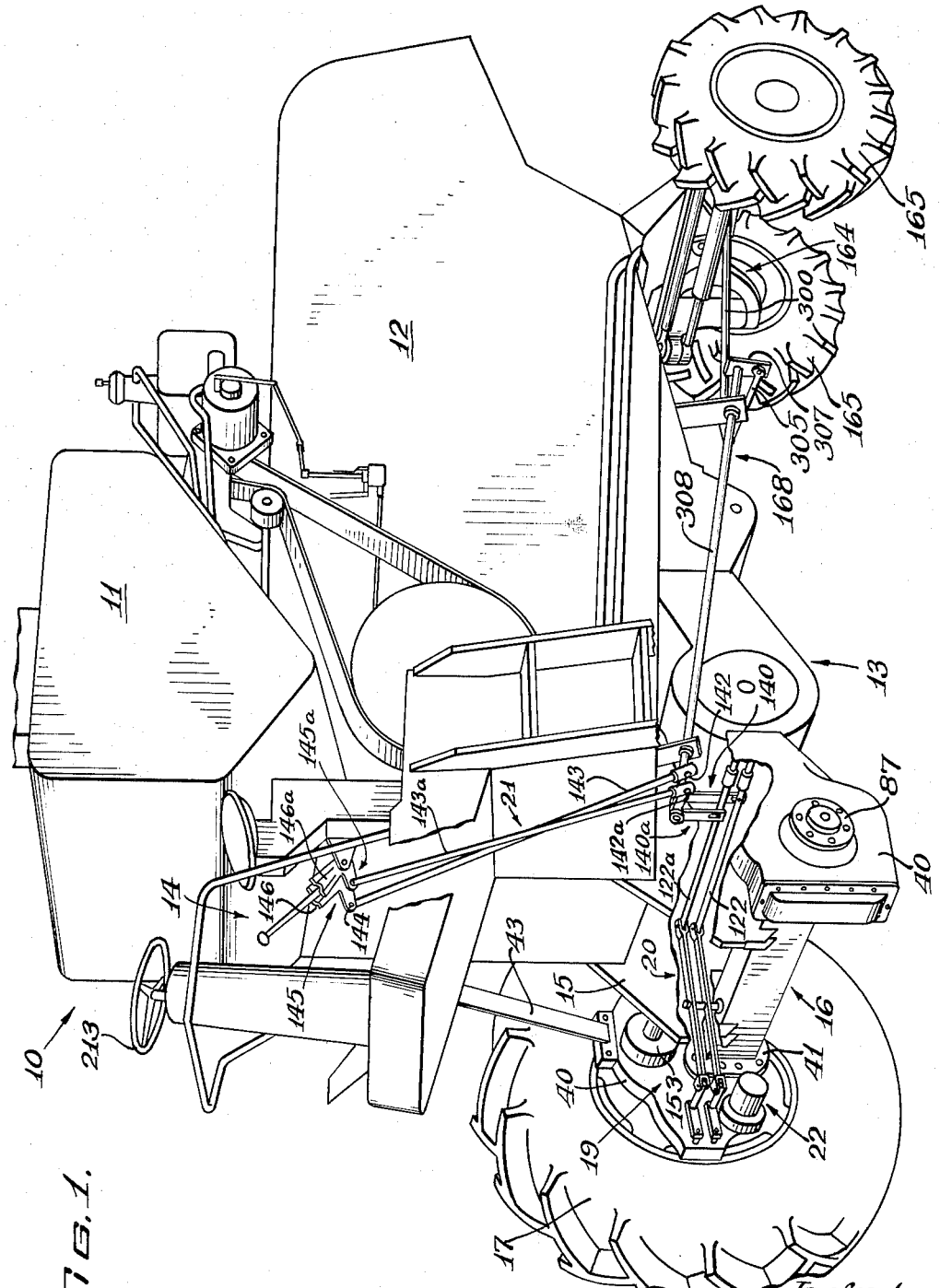
Inventors:
Stuart D. Pool
Richard R. Steingas
Clayton L. Enix
By
Walter G. Gregory Atty.

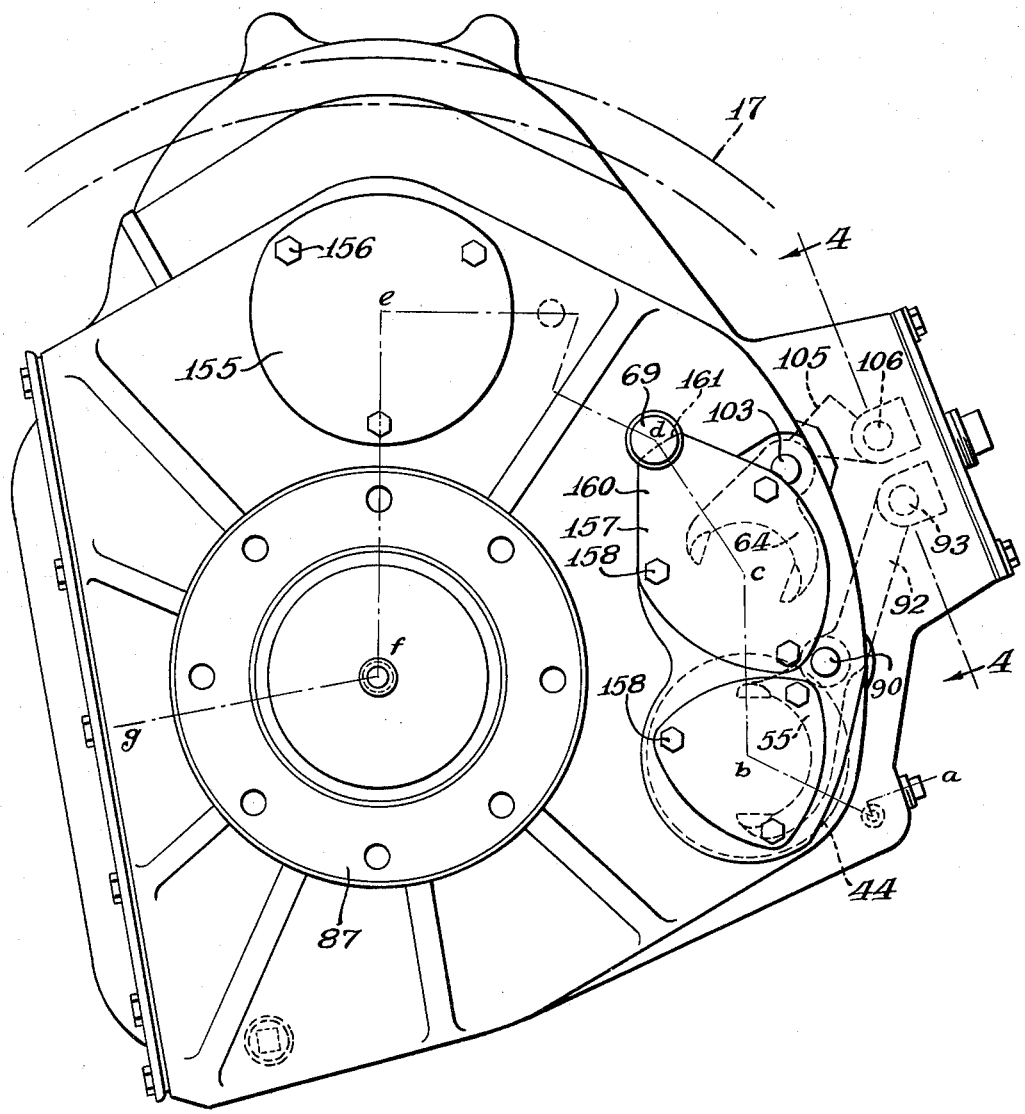

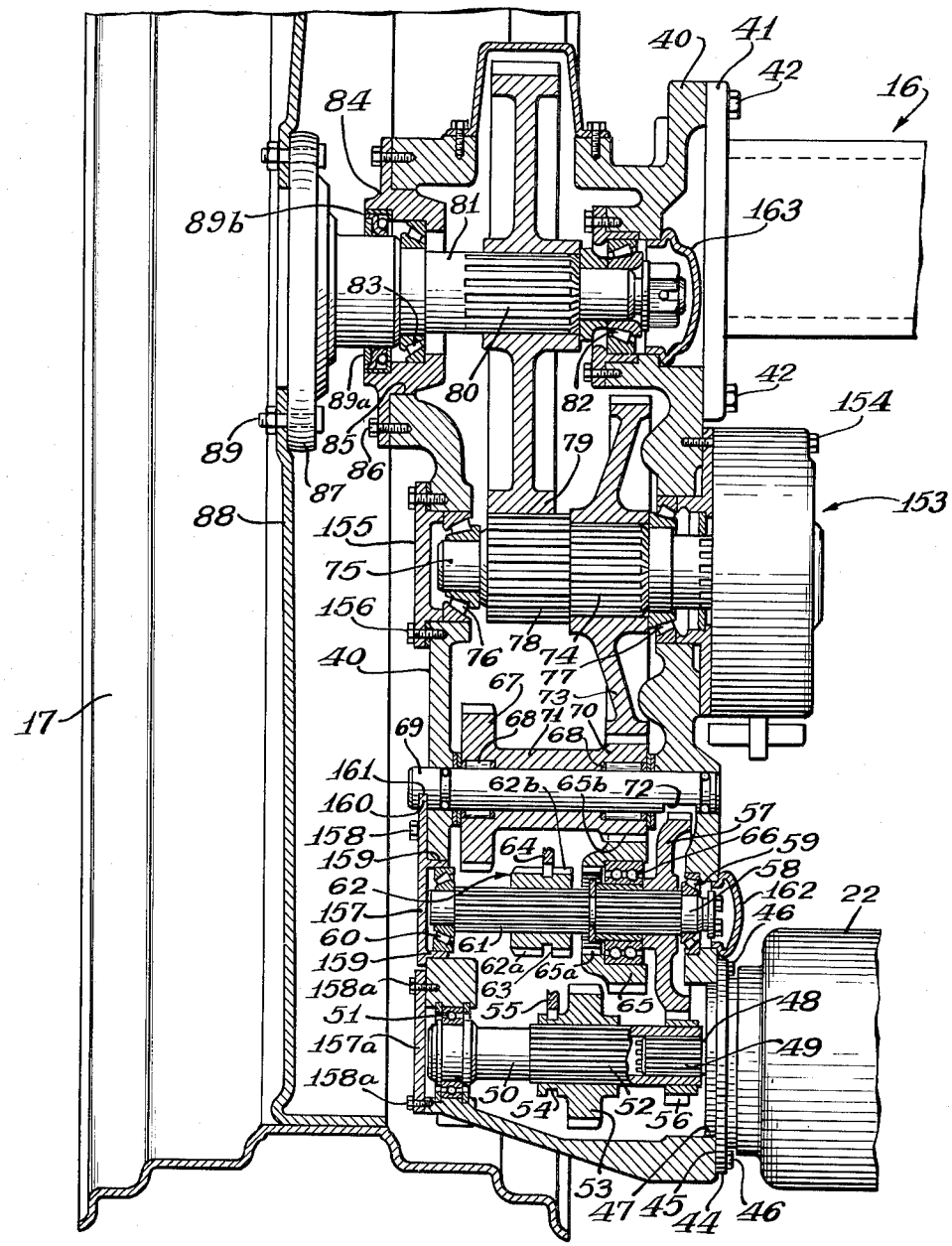

April 19, 1966  S. D. POOL ETAL  3,246,715
HYDRAULIC PROPULSION DRIVE MECHANISM
Filed March 3, 1964  9 Sheets-Sheet 4
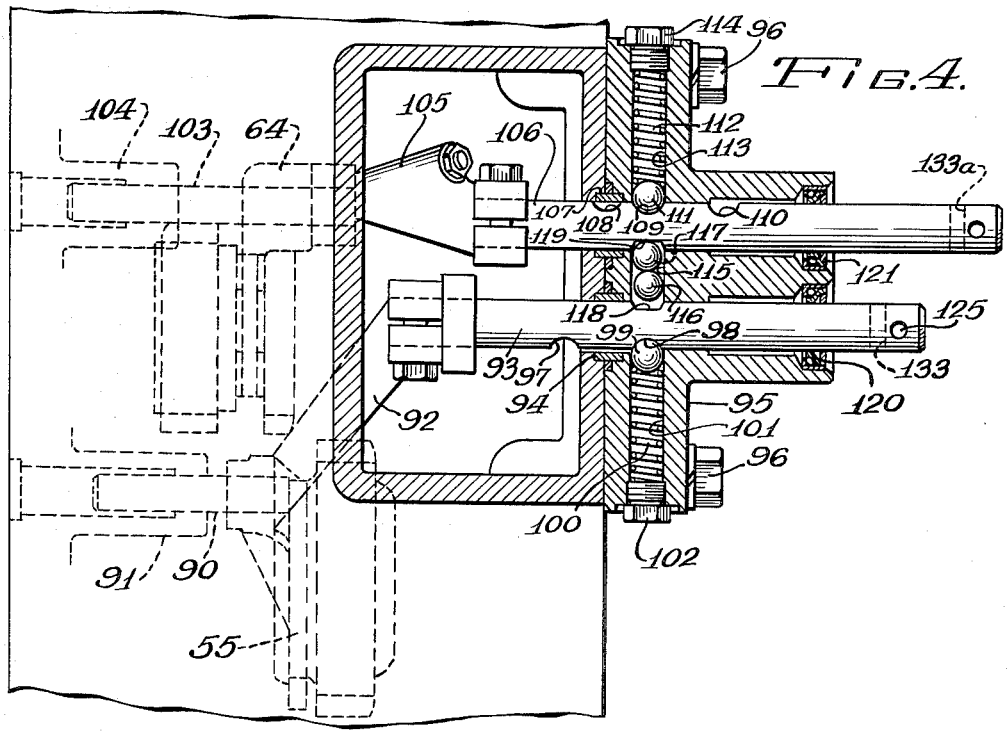
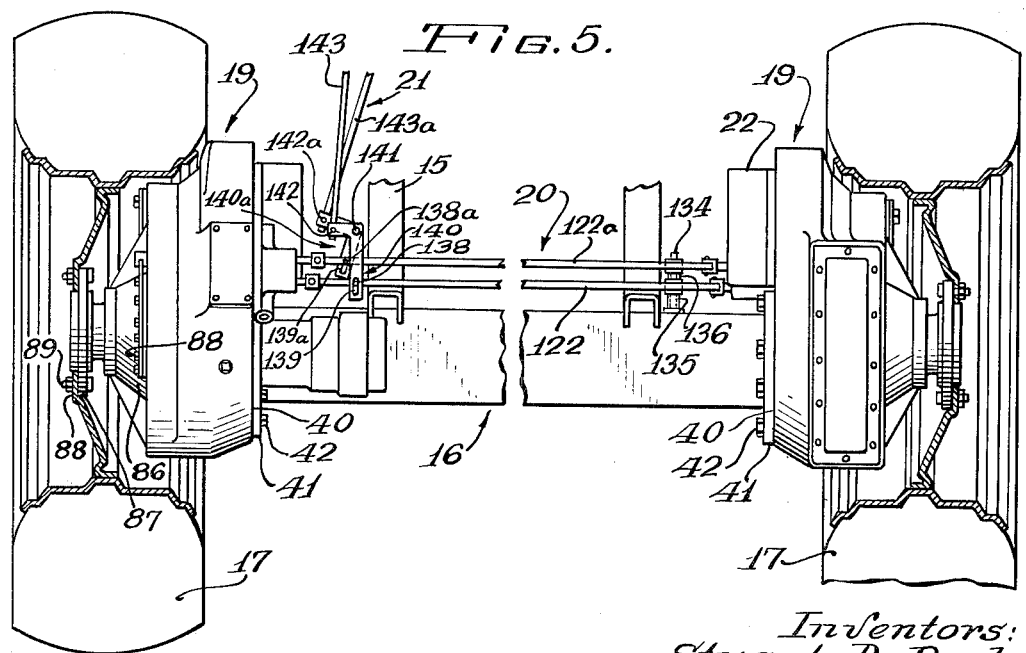
Inventors:
Stuart D. Pool
Richard R. Steingas
Clayton L. Enix
By Walter G. Gregory
Atty.

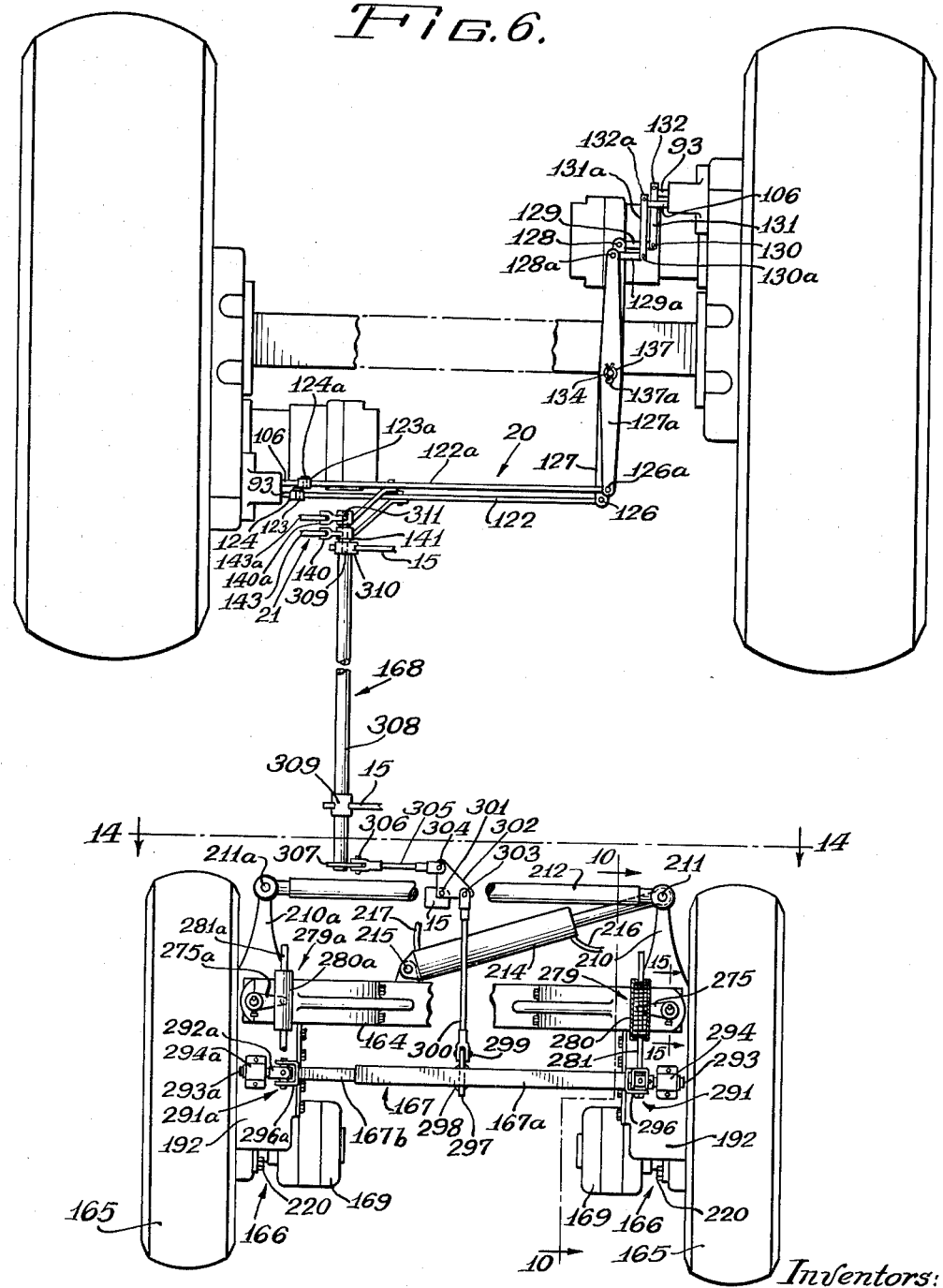

April 19, 1966    S. D. POOL ETAL    3,246,715
HYDRAULIC PROPULSION DRIVE MECHANISM
Filed March 3, 1964    9 Sheets-Sheet 6
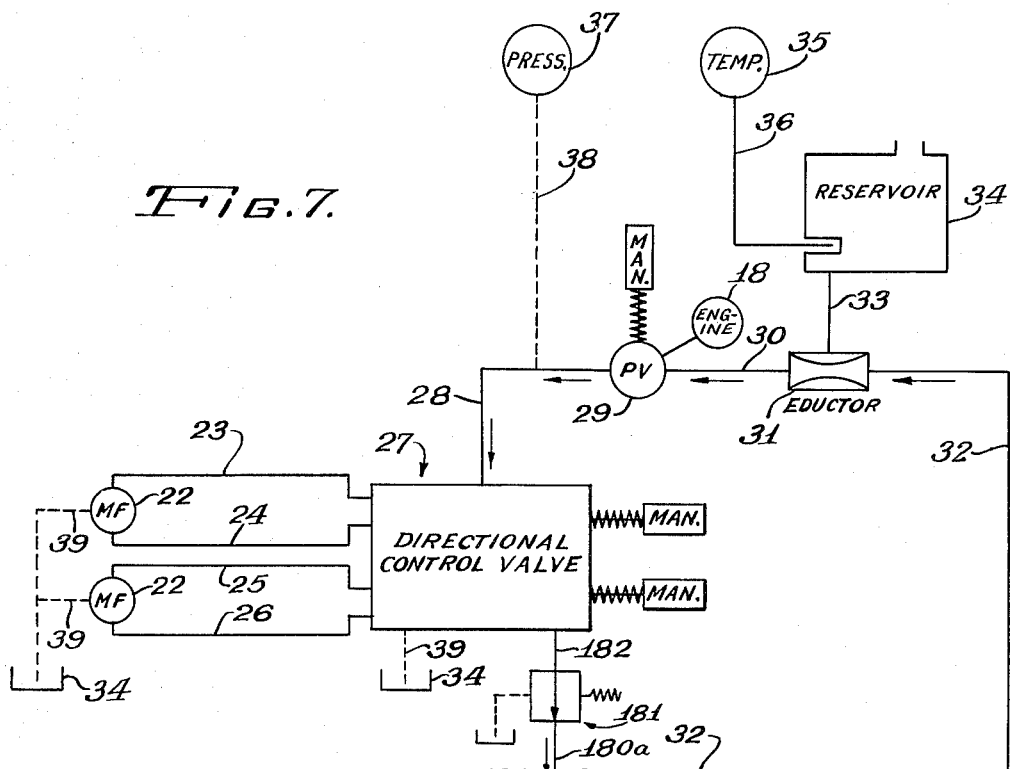
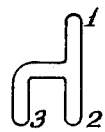
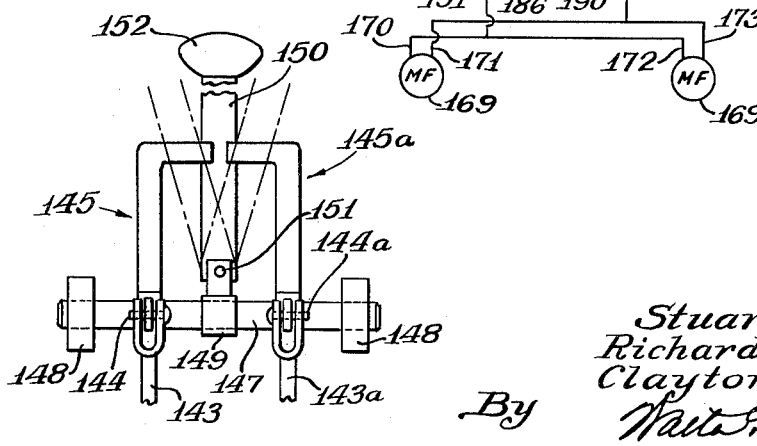
Inventors:
Stuart D. Pool
Richard R. Steingas
Clayton L. Enix
By
Atty.

April 19, 1966  S. D. POOL ETAL  3,246,715
HYDRAULIC PROPULSION DRIVE MECHANISM
Filed March 3, 1964  9 Sheets-Sheet 7

Inventors:
Stuart D. Pool
Richard R. Steingas
Clayton L. Enix
By Walter P Heroy
Atty.

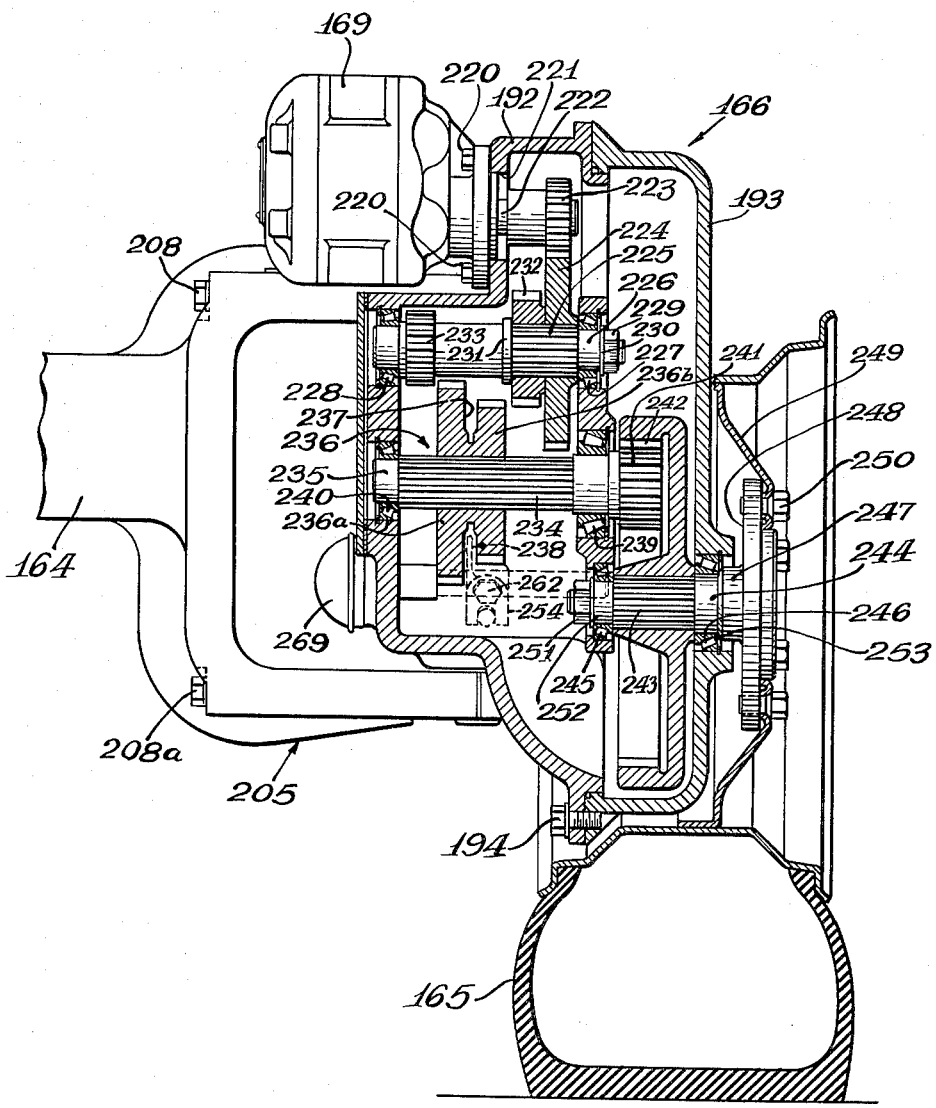

April 19, 1966     S. D. POOL ETAL     3,246,715
HYDRAULIC PROPULSION DRIVE MECHANISM
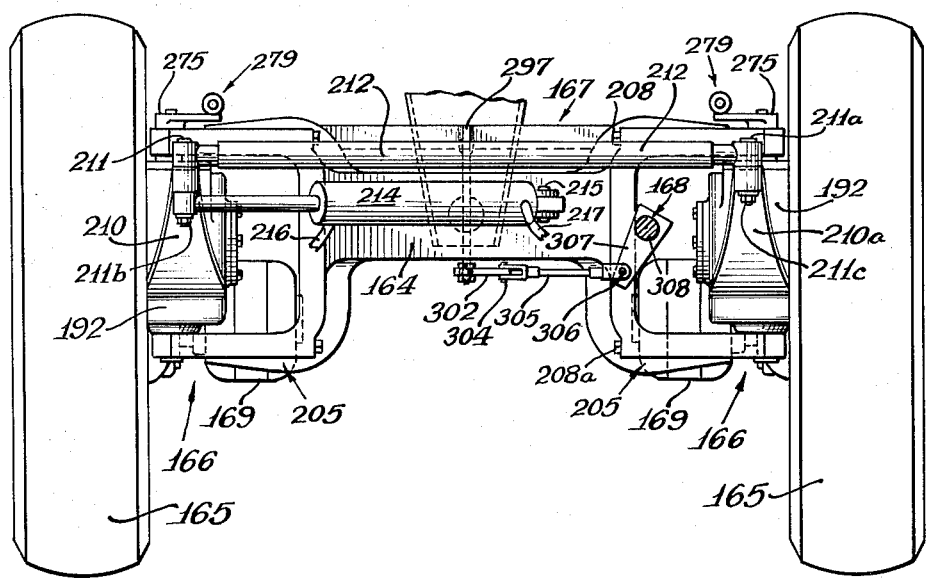
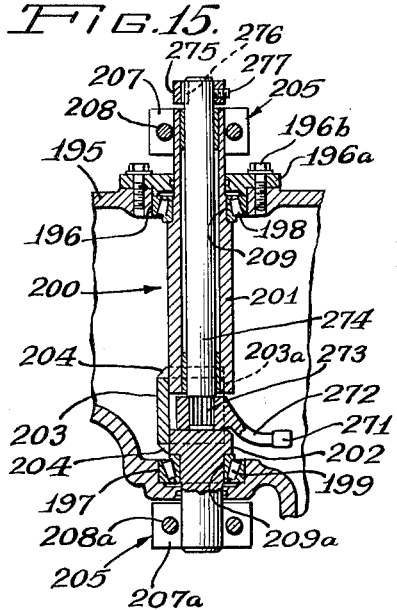
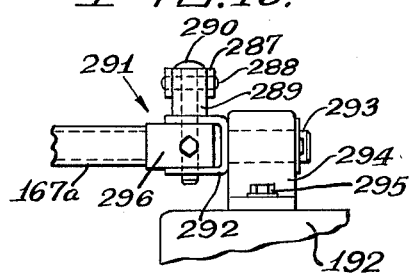
Inventors:
Stuart D. Pool
Richard R. Steingas
Clayton L. Enix United States Patent Office 3,246,715
Patented Apr. 19, 1966

1

3,246,715
HYDRAULIC PROPULSION DRIVE MECHANISM
Stuart D. Pool and Richard R. Steingas, Naperville, Ill., and Clayton L. Enix, Fort Collins, Colo., assignors to International Harvester Company, Chicago, Ill., a corporation of New Jersey
Filed Mar. 3, 1964, Ser. No. 349,029
20 Claims. (Cl. 180—44)

This invention relates to change-speed transmission drives, but more particularly it is directed to a power drive of the character wherein rotary-type hydraulic motors are coupled one each through manually shiftable and individual change-speed gear transmissions to respective wheels of an agricultural vehicle to provide propulsion or drive for said vehicle.

This invention is related to but constitutes an improvement over the structure presented in co-pending U.S. patent application Serial No. 310,593 assigned to the same assignees as the present invention. Heretofore, hydraulic motors operated in combination with change-speed devices, have been used for vehicle drive mechanisms in a variety of installations and with varying degrees of success and effectiveness. Such installations, as is well known, have been made utilizing various numbers of the vehicle's wheels for driving, including at times the steerable wheels thereof. The present invention, therefore, is interested in providing as a primary objective thereof a unique and improved hydraulic propulsion drive mechanism utilizing manually operable speed-varying means therewith that employs drive coupling to the steerable wheels as well as to the main traction wheels of a vehicle, and which mechanism is particularly adaptable for although not limited to incorporation in combine-type agricultural vehicles.

Another object is to provide an improved hydraulic propulsion drive arrangement wherein change-speed gear-type transmissions each providing a plurality of speed-ratios therethrough are operatively coupled one each with each wheel of a pair of main traction wheels of an agricultural vehicle while other change-speed gear type transmissions each providing one less plurality of speed-ratios than the main transmissions therethrough are operatively coupled one each with each wheel of a pair of steerable powered guide wheels on the vehicle.

Another important object is to provide, in an agricultural vehicle having a pair of main traction wheels and a pair of steerable guide wheels, a hydraulic propulsion drive wherein each wheel has mounted in part therewithin and operatively coupled thereto a change-speed gear-type transmission and a rotary-type hydraulic motor driving the respective wheel, with the guide or steerable wheel motors being connected in the fluid pressure circuit downstream from the main traction wheel motors and wherein the fluid flow relationship between the motors associated with the transmissions in the main wheels and the motors associated with the transmissions in the guide wheels is such that normally when the main traction wheels are propelling the vehicle in certain selected gear speed ratios the guide wheel motors function as pumps and do not provide drive to the latter wheels, but wherein when one or more of the main traction wheels slips and thus provides only limited traction for the associated main traction wheels the guide wheel motors thereupon operate as motors to aid in providing power drive for the vehicle by way of said guide wheels.

A further object is to provide, in a power drive fashioned with a change-speed transmission in combination with a rotary-type fluid pressure propulsion motor for each wheel of the vehicle, a unique control linkage operative responsive to actuation by a single operator's control handle for selecting a desired speed ratio or range, from

2 the ranges available through all said transmissions simultaneously, and including interlocking detent means operative to prevent more than one such speed ratio being selected at a time therein.

A still further object is to provide an improved control linkage mechanism for operatively interconnecting speed-range selecting elements of a pair of change-speed transmissions coupled one each to laterally spaced main traction wheels with speed-range selecting elements of a pair of change-speed transmissions coupled one each to laterally spaced guide wheels of a vehicle, and powered by hydraulic motors associated one individual motor with each of said transmissions, and wherein simultaneous operation is effected in selection of desired speed ranges in each of said transmissions for the drive being transmitted therethrough to the respective wheels, but wherein the fluid flow to said hydraulic motors may be individually controlled so as to aid in effecting a turning or steering of the vehicle by way of the associated main traction wheels, as well as to facilitate rice field and hillside operations.

A yet still further object is to provide, in a vehicle hydraulic propulsion drive fashioned with a change-speed gear transmission in combination with a rotary-type fluid pressure propulsion motor operatively coupled one such combination each to a wheel of the vehicle, an improved hydraulic control circuit therefor having a first valve controlling the direction of fluid flow to the main traction wheels of the vehicle and a second valve downstream from said first valve controlling the direction of fluid flow to the steerable guide wheels of the vehicle, and wherein an anti-cavitation device communicately interconnects the pressure and return flow sides of the guide wheel motors and is operative to permit recirculation of a limited amount of fluid flow downstream from the guide wheel motors to the upstream inlet or pressure side of the latter motors when the linear driving rotation or fluid flow relation is such that the guide wheels lag the main traction wheels of the vehicle.

A further important object is to provide an agricultural vehicle having a pair of forwardly positioned main traction wheels and a pair of rearwardly positioned steerable guide wheels with a change-speed gear-type transmission and a rotary-type hydraulic motor assembly coupled one assembly to each wheel of the vehicle, and wherein the steerable guide wheels thereof are pivotally mounted each on a vertical axis forwardly off-set from the vertical or perpendicular center line of the respective steerable guide wheel whereby the rear end of the vehicle is selectively shifted to one side or the other when said steerable guide wheels are turned for the purpose of steering the vehicle.

Another more general object is to provide an improved and simplified speed-varying power drive means for a self-propelled agricultural combine-type vehicle.

Further objects and advantages of the invention will become apparent as the following description proceeds, and the features of novelty which characterize the invention will be pointed out with particularity in the claims annexed to and forming part of this specification. For a better understanding of the invention, reference may be had to the accompanying drawings in which:

FIGURE 1 is a perspective view of an agricultural combine vehicle incorporating the proposed power drive mechanism therein and shown with the nearest main traction wheel removed to better illustrate the proposed control linkage employed therewith;

FIGURE 2 is a side elevational view as seen from the wheel attaching side of the change-speed transmission unit utilized with one of the main traction wheels in the proposed invention;

FIGURE 3 is a transverse sectional and vertically elongated view taken generally along the line *a–b–c–d–e–f–g* of FIGURE 2 showing the relative disposition of the gear elements in one of the change-speed transmission units in one of the main traction wheels, the transmission being conditioned in this view for neutral operation.

FIGURE 4 is a fragmentary vertical generally sectional view, in enlarged dimensions, taken generally along the line 4—4 of FIGURE 2;

FIGURE 5 is a fragmentary forwardly looking elevational view, with portions thereof in section, of the main drive wheels and front axle assembly area of a combine vehicle showing the proposed interconnecting gear selection linkage for controlling the transversely spaced transmission units of the main traction wheels;

FIGURE 6 is a fragmentary plan view of the interconnecting gear selection linkage control mechanism;

FIGURE 7 is a schematic diagram of the hydraulic circuit employed with the proposed hydraulic power drive mechanism;

FIGURE 8 is a detail, in enlarged dimensions, of operator's shift linkage control handle mechanism;

FIGURE 9 is a diagram of the shift pattern for the various speed-range selections;

FIGURE 11 is a transverse sectional and vertically elongated view, somewhat similar to FIGURE 3, but taken generally along the line 1–2–3–4 of FIGURE 10 and showing the relative dispositions of the gear elements in a change-speed transmission unit incorporated in one of the powered guide wheels, the transmission being conditioned in this view for neutral operation;

FIGURE 14 is a fragmentary elevational view of and looking rearwardly toward the rear axle and guide wheel assembly;

FIGURE 15 is a fragmentary vertical sectional view taken along the line 15—15 of FIGURE 6; and FIGURE 16 is an elevational view of one of the double universal joints employed with the telescoping shift control cross-shaft linkage.

Figure 10:
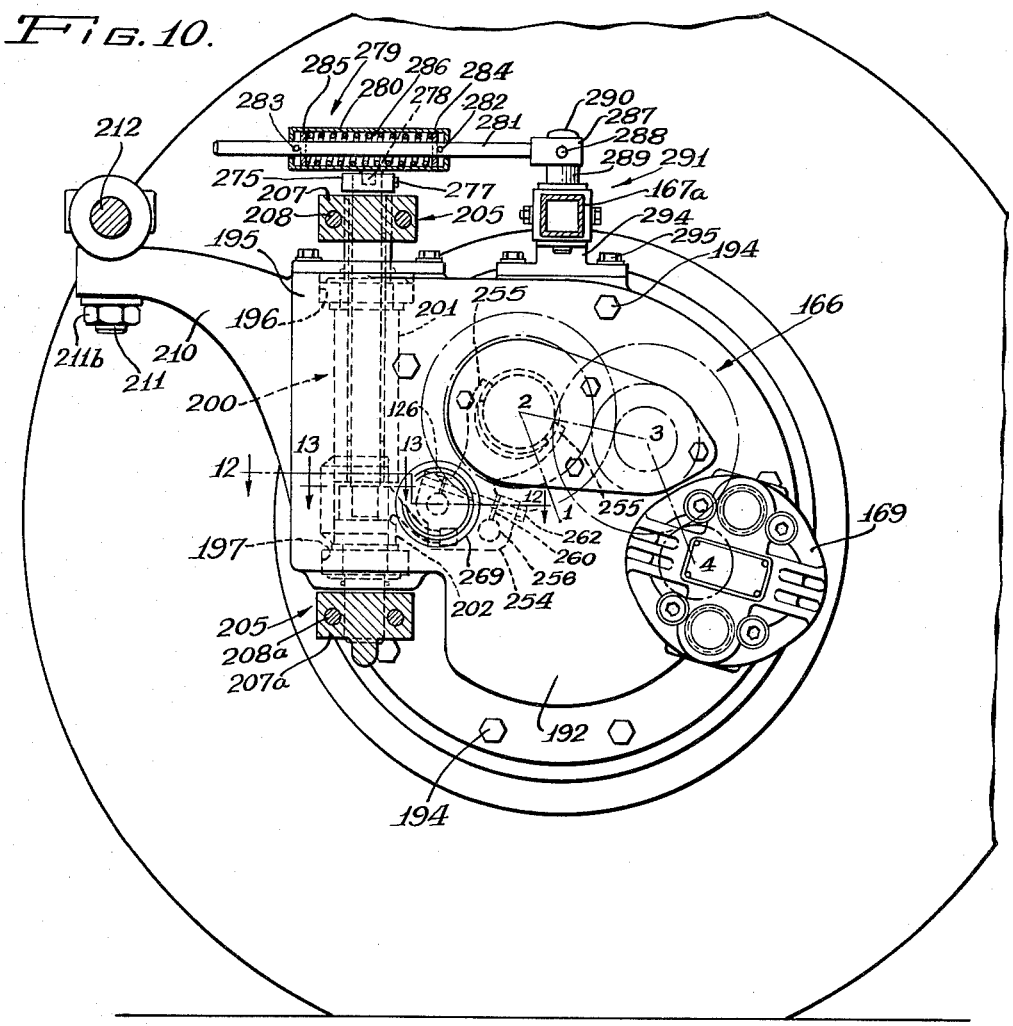
FIGURE 10 is a side elevational view with portions thereof in section, and somewhat similar to FIGURE 2, but as seen from a position opposite to the wheel attaching side thereof, of the change-speed transmission unit utilized with one of the powered guide wheels in the proposed invention.
Figure 12:
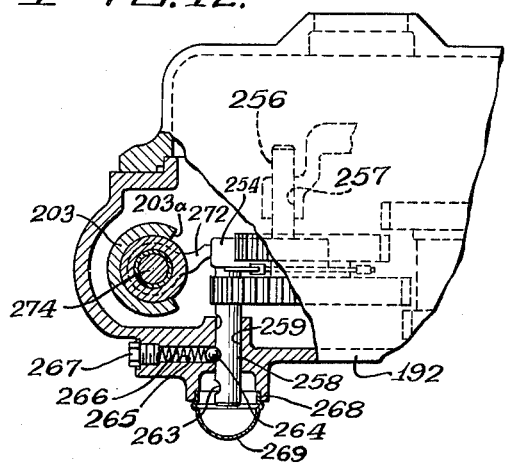
FIGURE 12 is a fragmentary, horizontal and generally sectional view, in enlarged dimensions, taken generally along the line 12—12 of FIGURE 10.
Figure 13:
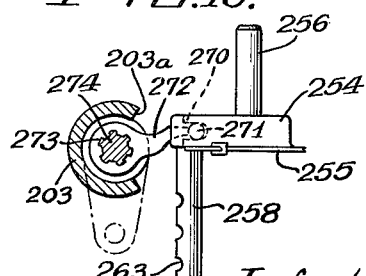
FIGURE 13 is a fragmentary, horizontal sectional view, in enlarged dimensions and partly in section, taken generally along the line 13—13 of FIGURE 10.

Referring now to the drawings, it will be noted the proposed invention is shown, for illustrative purposes, as incorporated in a self-propelled type of agricultural combine vehicle. Since all of the components of the vehicle are not of particularly pertinent interest to the inventive features hereof only those elements which are of specific import or interest and application to the present invention are illustrated and described in detail herein. The vehicle, which is designated in its entirety by the reference numeral 10, may include as well-known and conventional components thereof a grain tank 11, a grain threshing, separating and cleaning chamber area 12, an air blower assembly 13 and an operator's station 14 all suitably mounted on a frame 15. Said frame, in turn, is supportably carried by way of a forwardly disposed affixed axle assembly 16 and a rear axle assembly 16a, respectively, carried by a pair of forward traction or propulsion wheels 17, 17, and a pair of rear support and steerable guide wheels 165, 165. It is understood, of course, suitable conventional mechanism (not shown) will be provided to control the said guide wheels as hereinafter described. Since the threshing, separating and cleaning operations are accomplished in a generally conventional and well-known manner, further details of construction of the components and the driving mechanism for accomplishing these specific operations are believed unnecessary to a proper understanding of the present invention, and hence are omitted herefrom. It will be understood, likewise, that these various operating components will (by means not shown) be suitably connected to and powered by the associated vehicle's prime mover or engine shown only schematically and indicated herein by the reference numeral 18 (FIGURE 7).

Each of the transversely spaced main traction wheels 17, 17 has disposed, in part, therewithin a change-speed transmission unit assembly, such as is indicated in the entirety by reference numeral 19, but since the two such transmission units are of similar construction, with one for the left and one for the right wheels, only one thereof will be described in detail. Said transmission units 19, 19 are interconnected for simultaneous speed-ratio change operations by control linkage, such as is indicated generally at 20, and this linkage, in turn, is operatively joined by linkage mechanism 21 which extends to the operator's station 14 where it is available for actuation by the vehicle operator. Each said transmission unit is motivated or driven by a conventional fluid-pressure motor such as the well known rotary-type hydraulic motor indicated generally at 22 and said motors, in turn, are connected by fluid-carrying conduits 23, 24, and 25, 26 respectively, to a directional control valve assembly indicated in its entirety at 27. Said directional control valve has the input or pressure side thereof connected by a conduit 28 to the pressure outlet of a conventional hydraulic pump 29 which, in turn, is power driven by the vehicle engine 18 through suitable drive means (not shown). The inlet side of said pump is connected by conduit 30 to one end of an eductor device 31 while an opposite end of said eductor is connected by conduit 32 and by way of other components to be subsequently described with the outlet or exhaust side of directional control valve 27, and a mid-portion of said eductor is connected by a conduit or fluid passage 33 into a fluid reservoir 34. Eductor 31 may be of the type disclosed in co-pending U.S. patent application Serial No. 248,661, now Patent No. 3,207,244, and assigned to the same assignees as the present invention. Reservoir 34 may be equipped with a temperature gauge 35 connected thereto by a conduit 36, and, if desired, a pressure gauge 37 may be connected into pressure conduit 28 by a conduit line 38. Directional control valve 27 may be any suitable conventional device such as will permit individual operational control of the hydraulic drive motors 22, 22 including the directional control of fluid therethrough. A valve assembly suitable for such control is disclosed in the co-pending U.S. patent application Serial No. 295,731 and assigned to the same assignees as the present invention. Suitable drainage or seepage conduit lines such as represented by the broken lines 39 (FIGURE 7) may be utilized to drain leakage fluid from the hydraulic motors to reservoir 34 as is well known.

Since the hydraulic motors may be individually controlled by operation of directional control valve 27, it will be appreciated that a form of independent operation of the individual main traction wheels is attained, even though the speed-gear-change transmissions thereof are coupled for simultaneous speed gear ratio selection operation, thereby permitting a form of turning or steering of the associated vehicle.

For a clearer understanding of the specific features of the transmission units proposed for the main traction wheels, reference may be had to FIGURE 3 wherein there is depicted a vertical sectional view of one such unit and which view has been intentionally, distortably elongated, or developed so as to more clearly show the engageable relationship of the various journalling shafts and meshing gear elements therewithin. It will be appreciated, of course, that, although this figure of the drawings shows all the gears and their journalling shafts in a vertically spaced arrangement, the actual disposition of these elements more nearly resembles an irregularly formed circular geometric figure wherein the various components are neatly and effectively compacted and clustered within the transmission unit's housing. Each main wheel transmission unit, as fashioned, includes a housing or casing structure 40 having a flanged rim or boss-like portion on one wall thereof which seatingly mates with a similarly flanged portion 41 on one end of front axle assembly 16 whereby the said unit is mounted to the axle and may be fixedly secured thereto by suitable fastening means such as the cap screws or bolts indicated at 42. A reinforcing member or brace 43 (FIGURE 1) may be extended from one side of frame 15 proximate operator's platform 14 to the housing 40 of the proximate transmission unit for the purpose of providing added rigidity to the associated transmission housing. Although only one such brace has been illustrated, it will be understood a similar brace may also be provided for the oppositely disposed housing unit. Each hydraulic motor 22 has a flanged portion 44 thereon which mates with a similar seating portion 45 on the same side wall of housing 40 to which axle assembly 16 is attached and suitable fastening cap screws or bolts 46 provide means for fixedly securing the hydraulic motor to the respective housing. An aperture 47 in said transmission housing accommodates the drive shaft 48, of the respective hydraulic motor, which shaft extends into said transmission unit and is telescopingly joined or coupled therein, by any suitable means such as the splining indicated at 49, to a shaft 50 journalled at its opposite end by the anti-friction bearing 51 in transmission housing 40.

Exterior splines 52 on shaft 50 slidably accommodate a spur gear member 53 which is dimensioned and disposed for axially slidable movement therealong. A generally U-shaped annular recess or channel 54 fashioned on a hub portion on one side of gear 53 receivingly accommodates a shifter fork mechanism, indicated fragmentarily at 55 (FIGURE 3), for purposes of slidably actuating said gear as will be subsequently explained. Also mounted by splines 52 on shaft 50 is a gear 56 which is disposed for continuous meshing engagement with a gear 57 mounted on and constrained for rotation with a shaft 58 journalled at opposite ends thereof in opposite side walls of housing 40 by the respective bearing means 59 and 60. Exterior splines 61 fashioned on shaft 58 slidably accommodate a cluster-type gear 62 slidably movable therealong and which comprises gears 62a and 62b with an annular channel or recess 63 therebetween adapted to operatively receive therewithin a shifter fork mechanism, such as indicated fragmentarily at 64 (FIGURE 3). A gear member 65, journalled by bearing means 66 on shaft 58, includes an interior ring gear portion 65a and an exterior gear portion 65b. The gear cluster 62 is axially slidable through actuation by shifter fork mechanism 64 in one direction for effecting meshing engagement of gear 62b with ring gear 65a, and in an opposite direction for meshingly engaging gear 62a with a gear 67 journalled by sleeve bearing means 68 on a stub shaft 69 suitably mounted in opposite side walls of transmission housing 40. Exterior gear 65b is disposed for continuous meshing engagement with the gear 70 also journalled on shaft 69 and attached by an axially extending hub or quill-like portion 71 to gear 67 and constrained for rotation therewith. A cut-away portion proximate one end of stub shaft 69 provides a recess or shoulder 72 in said shaft which accommodates in a physical clearance relationship the teeth of gear 57 otherwise in engaging conflict with said latter stub shaft. Gear 70 is also disposed for continuous meshing engagement with a gear 73 which is mounted by splines 74 onto a shaft 75 journalled at opposite ends thereof in opposite side walls of housing 40 by the respective anti-friction bearing means 76 and 77. A gear 78 fashioned proximate one end of shaft 75 is disposed for continuous meshing engagement with a gear 79 mounted by splines 80 onto a shaft 81 journalled by anti-friction bearing means 82 at one end thereof in one sidewall of housing 40, and at the opposite end of said shaft by the anti-friction bearing means 83 which are carried by a ring-like bushing or closure member 84 disposed in an aperture 85 in housing 40 and suitably detachably secured therein by fastening bolts 86. One end of shaft 81 extends outwardly through the bushing 84 and has a flange 87 mounted on the outer end thereof and which flange is disposed for attachment to the flange portion 88 of a main traction wheel 17 and secured thereto by fastening bolts or cap screws such as shown at 89. A fluid seal 89a may be provided in a counterbore portion 89b of said bushing to restrict fluid leakage along shaft 81 as is well understood.

With cluster gear 62 neutrally positioned axially so as to be out of engagement with gears 67 and 65 while gear 53 is out of engagement with gear 65 the power train through the transmission is interrupted and the unit is termed as being conditioned for neutral operation. With gears 53 and 65 disengaged while gears 62a and 67 are in meshing engagement the unit is conditioned for the first gear ratio or speed-range therethrough. With gears 62b and 65a in meshing engagement and gears 53 and 65 disengaged the unit is conditioned for the second gear ratio or speed-range therethrough. With gears 53 and 65b in meshing engagement and gear cluster 62 disengaged the unit is conditioned for the third gear ratio or speed-range therethrough.

The shifter fork 55 is mounted on and suitably secured to a stub shaft 90 (FIGURES 2 and 4) which, in turn, is slidably mounted for axial movement in a journalling boss 91 in one side of housing 40. Said shifter fork is also provided with a rigidly connected arm 92 the free end of which is securely but detachably mounted on a short operating shaft 93 journalled by a sleeve bearing 94 which mounts partially in a side wall portion of housing 40 and in part in an extension bearing and sealing member 95 affixed to said housing by suitable means such as the screws 96. Detent recesses 97 and 98 axially spaced along one side of shaft 93 are adapted to receive a ball detent member 99 forced selectively thereinto by a spring 100 disposed in an aperture 101 in said extension member and retained therein by a threaded closure plug 102. The shifter fork 64 is similarly mounted on and suitably secured to a stub shaft 103 slidably mounted for axial movement in a journalling boss 104 in one side wall of housing 40. Fork 64 includes a rigidly connected arm 105 the free end of which is securely but detachably mounted on a short operating shaft 106 journalled by a sleeve bearing 107. Detent recesses 108, 109 and 110 axially spaced along one side of shaft 106 are adapted to receive a ball detent member 111 pressed selectively thereinto by a spring 112 disposed in an aperture 113 in said extension member and retained therein by a threaded closure plug 114. A transversely disposed aperture 115 extending between the shafts 93 and 106 contains two ball detent members 116 and 117 that are disposed for selective positioning one each into respective detent recesses 118 and 119 in the respective shafts 93 and 106. The recesses 118 and 119 are radially displaced one each from a respective one of the recesses 98 and 109. This transversely disposed or intermediate detent mechanism provides an interlock feature so as to assure that one of the shafts 93 or 106 is always in neutral. In this manner, only when one shaft is in neutral may the remaining shaft be shifted to provide a desired gear speed ratio range drive selection. Then in order to shift the first of said shafts the second one thereof must be neutrally positioned. Fluid sealing devices such as indicated at 120 and 121 may be provided to restrict fluid flow along the respective shafts 93 and 106 (FIGURE 4) as is generally conventional. It will be understood, of course, that each transmission unit includes the shifter forks actuating members just described and that such shifter fork mechanisms are interconnected by the control linkage 20 as hereinafter noted.

The interconnecting control linkage 20 (FIGURE 6) comprises a pair of linkage assemblies arranged so that one such linkage interconnects the corresponding upwardly disposed and outwardly projecting short operating shafts designated 106 of each transmission unit, while the other or lower linkage similarly interconnects the corresponding operating shafts designated 93. The lower such linkage includes a transversely extending long link or rod 122 connected at one end by a connector 123 affixed to one end of link 122 and having a cap screw 124 therein positionable in a radial aperture 125 in shaft 93, and at its opposite end is pivotally connected at 126 to a longitudinally extending, direction reversing lever 127. The opposite end of lever 127, in turn, is pivotally connected at 128 to an arm 129 of a crank and the other end of arm 129 is pivotally connected at 130 to another arm 131 of said crank. The opposite end of said latter arm includes a split end that fits over the end portion of shaft 93 in the proximate transmission unit and a cap screw 132 threaded therein is received in a slot-like recess 133 in shaft 93. In similar fashion the shafts 106, 106 of the respective transmission units are interconnected with similar linkage elements designated by the same reference numerals plus the suffix "a" for like elements.

A post-like stud or pin 134 fixedly mounted on axle assembly 16 pivotally supports the reversing levers 127, 127a with sleeve-like spacers 135 and 136 therebetween, while a washer 137 and cotter pin 137a on the outer end thereof operates to retain said lever in position on the pin. It will now be seen that as the link 122 is moved to the left, as viewed in FIGURES 4–6, both the shafts 93, 93 move inwardly into the respective transmission units, and contrawise when said link is moved to the right. Similarly when link 122a is moved leftwardly the shafts 106, 106 are moved inwardly, and contrawise when said latter link is moved rightwardly. It will also be noted that the two linkage assemblies which comprise control linkage 20 although operable independently of one another have the movements thereof further correlated by the interlocking intermediate detents previously described.

The transversely extending link 122 has a pin or stud 138 affixed thereto that receives a slotted opening 139 fashioned in one arm of a bell-crank 140 which, in turn, is pivotally mounted at 141 while the other arm of said bell-crank is pivotally connected at 142 to a vertically extending long link or rod member 143. The opposite end of said latter rod member is pivotally connected at 144 (FIGURES 1 and 8) to one arm of an upwardly disposed bell-crank 145 while the other arm of said latter bell-crank is fashioned with a longitudinal recess 146. The link 122a is likewise interconnected to an upwardly disposed bell-crank 145a and similar elements have been designated by line reference numerals plus the suffix "a" thereto. Bell-cranks 145, 145a are pivotally mounted on a shaft 147 which, in turn, is journally mounted at opposite ends thereof by bearing brackets 148, 148 carried by the frame 15. Also mounted on shaft 147 is a rocking head member 149 that may be constrained for rotation with said shaft, and a gear shift control hand lever 150 is pivotally connected at 151 to said head, while a knob-like handle 152 on the upper end of said hand lever facilitates actuation thereof by an operator. Gear shift hand lever 150 as disposed may be rotated with shaft 147 and may be pivoted about pivot 151 in a form of universal movement to selectively engage the oppositely facing recesses 146, 146a in the respective bell-cranks 145, 145a.

A braking device indicated in its entirety at 153 (FIGURE 3) is secured to housing 40 by suitable mounting means such as the bolts or cap screws 154. Said braking device may be any conventional such device which is adapted to apply braking action to the shaft 75 and brake the vehicle thus providing a braking feature supplemental to that inherent in the hydraulic propulsion motors. One such device found to be suitable for the purpose is the twin disc commercial product of Auto Specialties Company of St. Joseph, Michigan. It is understood, of course, suitable actuating mechanism will be provided according to the brake device selected for the purpose.

In the preferred embodiment illustrated herein it will be noted detachable covering devices have been provided for the ends of some of the shafts in the main traction wheels transmission units and since these covers in some instances provide additional functions further explanation may be in order. For instance, one end of shaft 75 is covered by a cover plate 155 which additionally functions as a bearing retainer for the anti-friction bearing means 76. Suitable fastening bolts 156 detachably affix said cover plate to housing 40. A cover plate 157, affixed by fastening bolts 158 to housing 40, covers one end of shaft 58 and provides supports 159, 159 for anti-friction bearing 60 journalling said latter shaft. Cover plate 157 has an end edge portion 160 that projects into a slotted recess 161 in shaft 69 and thus functions to retain the latter shaft in position against axial displacement. Another cover plate 157a, affixed by fastening bolts 158a to housing 40, covers one end of shaft 50. Resilient cover clip 162 covers an opposite end of shaft 61 while a similar cover clip 163 may cover one end of shaft 81.

Reference is now made to the opposite or rearward end of the vehicle including the powered guide wheels supported thereon (FIGURES 1, 6, 7, 10–14).

Each of the transversely spaced steerable guide wheels 165, 165 has disposed, in part, therewithin a change-speed transmission unit assembly, such as is indicated in the entirety by reference numeral 166, but since the two such transmission units are of similar construction with one for the left and one for the right one of said wheels only one thereof need be described in detail. Said transmission units are interconnected for simultaneous speed-ratio selection operations by control linkage indicated generally at 167 which, in turn, is operatively joined by linkage mechanism 168 that ties into previously described linkage 21 and the latter extends to the operator's station 14 as will be hereinafter further explained. Each said guide wheel transmission unit is motivated or driven by a conventional fluid-pressure motor, such as the well-known rotary type hydraulic motors indicated generally at 169, 169 and said motors are connected by fluid carrying conduits, 170, 171 and 172, 173, respectively, into conduits 174, 175 that, in turn, communicatively connect with reversible flow work ports 176, 177 of a four-way, three-position tandem-center valve indicated generally at 178. A return flow port 179 of said valve communicatively connects with previously noted return conduit 32 and a pressure port 180 of the latter valve connects by way of conduit 180a with the outlet side of a relief valve indicated generally at 181, while the inlet side of said relief valve communicates by way of conduit 182 with the return or outlet port of directional control valve 27. It will be noted that with the proposed arrangement the guide wheel motors are connected for parallel fluid flow which has the effect of providing a differential action that prevents skidding of one of these wheels relative to the other.

Relief valve 181 may be any conventional or well-known type of relief unit suitable for venting fluid above a predetermined pressure to the reservoir, as is well understood. It is believed desirable to utilize a relief valve, as indicated, to limit the pressure to which the downstream equipment may be subjected. For instance, the main transmission motors may be operated at pressures in the neighborhood of 5000 p.s.i., whereas the pressures provided for the downstream guide wheel motors may be in the vicinity of 2000 p.s.i., in order to permit a more economical use of less expensive hydraulic equipment in this portion of the hydraulic system.

The directional control tandem-center valve 178 may be of conventional construction, and one well-known such unit having flow passages and ports arranged therein to accomplish the directional control desired herein, together with flow through in neutral, is the Waterman Hydraulics Corporation model 1618–3AXX presently available on the commercial markets.

A flow-limiting anti-cavitation valve, indicated generally at 183, is interconnected by way of conduits 184, 185 with the conduits 174, 175, and, in turn, with work ports 176, 177 of valve 178. Said anti-cavitation valve comprises a closed-ended casing 186 having port openings 187, 188 at opposite ends of the casing communicatively connected with the respective conduits 184, 185, and a wall-like member or partition 189 slidable within said casing. Said wall-like or baffle member has a plurality of small diametered openings 190 therethrough, disposed in areas of the member displaced radially outwardly beyond the perimeter of the openings circumscribed by port openings 187, 188, which permit fluid communication from one side to the other thereof while a coiled spring 191 is disposed to aid the pressure on the high pressure side therewithin in urging said wall-member to a closed position whereby flow through port 188 to port 187 is normally restricted as will be subsequently more fully explained.

For a clearer understanding of the specific features of the proposed guide wheel transmission units, reference may be had to FIGURE 11 wherein there is depicted a vertical sectional view of one such unit and which view has been intentionally, distortably elongated, or developed so as to more clearly show the engageable relationship of the various journalling shafts and meshing gear elements therewithin. It will readily be appreciated, of course, that although this figure of the drawings shows all the gears and their journalling shafts in a vertically spaced arrangement, the actual disposition of these elements more nearly resembles an irregularly formed semi-circular geometric figure with the various components neatly and effectively compacted and clustered within the transmission unit's housing, as seen generally by way of the broken lines in FIGURE 10.

Each guide wheel transmission unit, as fashioned, includes an inboard housing or casing portion 192 and an outboard housing or casing portion 193 detachably affixed to the outboard portion by suitable securing means such as the bolts or cap screws 194. A forwardly extending portion 195 (FIGURE 10) of inboard casing portion 192 provides vertically spaced coaxial upper and lower openings 196, 197, the upper opening being fitted with anti-friction bearing means 198 (FIGURE 15) while the lower opening is fitted with anti-friction bearing means 199. The upper opening 196 is covered with a bushing or cover-plate member 196a which, in turn, is secured by suitable means such as the cap screws 196b. Said bearings rotatably receive and journal a king-pin assembly indicated generally by the reference numeral 200. Each such king-pin assembly, as best seen in FIGS. 10 and 15, includes an elongated upper tubular spindle member 201, a lower solid spindle stud or pin member 202 coaxial therewith but vertically spaced therefrom, and an intermediate bridging or interconnecting member 203 generally tubular in shape with a portion of one side thereof open or cut-away as seen at 203a (see FIGS. 12, 13 and 15) and which is fixedly secured, as by welding, brazing or the like as indicated at 204, to each of said tubular and pin members to provide a rigid unitary assembly. The outwardly extending upper end portion of member 201 and the outwardly extending lower end portion of pin 202 are journalled in upper and lower arms, respectively, of a yoke 205 fashioned at one end of rear axle assembly 164, the opposite end of said axle being similarly formed. The journalling means provided at the ends of said yoke arms may include a bearing block portion formed integral with the associated yoke arm and a separate or split bearing block 207 secured to the fixed block by suitable screw means 208 after the king-pin assembly has been positioned therewithin. Since the upper and lower arms of the yoke have been similarly formed the same reference numerals may be applied to the bearing elements thereof with the suffix "a" added to indicate the lower elements. The end portions of king-pin 200 are provided with reduced diameter sections 209, 209a adjacent the respective yoke arm bearings so as to form shoulders that may abut the inner race of the respective bearings and thus accommodate vertical thrusts on the proximate bearings as well as restrict axial displacement of said assembly.

Extending forwardly from each inboard casing portion 192 and, preferably, formed integral therewith is a steering control arm 210 generally shaped as shown in FIGURE 10, with the outer end thereof pivotally connected by a stud or bolt 211 pivotally mounted in one end of a transversely extending tie-rod 212 the opposite end of which mounts on a similar bolt 211a carried by the transversely spaced opposite steering control arm 210a while threaded nuts 211b and 211c secure said respective bolts in position. Although any desired conventional means may be provided for operatively connecting the operator's steering wheel 213 with the tie-rod linkage mechanism for exercising steering control, as illustrated herein this includes a hydraulic cylinder or ram 214 the fixed end of which may be pivotally mounted at 215 to the rear axle assembly 164 while the opposite or extendable end of the ram may be pivotally connected to bolt 211. Conduits such as 216, 217 may be provided for connecting said ram into a suitable source of fluid pressure as well as to a conventional control valve actuable by steering wheel 213 all as is well known, but since these elements form no particular part of the inventive concepts hereof they are not shown and further details thereof appear unnecessary. In this arrangement of the steering mechanism it will be noted that the king-pin and its center of pivot for the steerable guide wheels is forwardly offset from the transverse centerline and from the perpendicular axes of the respective wheels. This permits shifting the rear of the vehicle to the side of the longitudinal axis of the vehicle when the wheels are steered thereby providing a fast steering reaction to correct for row crop alignment, such as is frequently necessary in corn picking operations. Such fast reaction becomes possible because it is not necessary for the rear or steerable wheels to move to the side in order to get a vehicle such as a combine in a turned attitude.

Each hydraulic motor 169 may be fixedly mounted to the respective transmission inboard casing portion 192 by suitable means such as the bolts indicated at 220. An aperture 221 in the wall of said casing portion accommodates a drive shaft 222, of a respective hydraulic motor, which shaft extends into the transmission unit and has a gear 223 suitably affixed to the free end thereof for rotation therewith. Gear 223 is in continuous meshing engagement with a gear 224 mounted by splines 225 on a shaft 226. Said shaft 226 is disposed parallel to shaft 222 and has opposite ends thereof journalled by anti-friction bearing means 227 and 228, in turn, mounted in opposite walls of transmission casing portion 192. The outboard end of shaft 226 has a threaded nut 229 thereon which cooperates with a washer 230 that is in engagement with bearing 227, and with a collar 231 on said shaft to retain the latter shaft against axial displacement. An additional gear 232 is closely positioned between collar 231 and gear 224 and constrained for rotation with said shaft 226 by means of the splines 225, while a further gear 233 suitably mounted on the opposite end of this shaft is also constrained for rotation therewith. Exterior splines 234 on a shaft 235 fixedly accommodate a cluster-type gear 236 for rotation therewith although said gear is slidably movable therealong. Said cluster comprises the gears 236a and 236b with an annular recess or channel 237 therebetween adapted to operatively receive therewithin a shifter fork mechanism, such as is indicated fragmentarily at 238 (FIG. 11). Gear cluster 236 is axially slidable through actuation by shifter fork mechanism 238 in one direction for effecting meshing engagement of gear 236a with gear 233 to condition the transmission for the low gear ratio or speed-range therethrough, and in an opposite direction for meshingly engaging gear 236b with gear 232 to condition the transmission for the high gear ratio or speed-range therethrough, thus selectively providing one of two change-speed power trains through the transmission. With gear cluster 236 neutrally positioned axially so as to be out of engagement with gears 233 and 232 the power train through the transmission is interrupted and the unit is termed as being conditioned for neutral or free-wheeling operation.

The shaft 235 is journalled at opposite ends thereof in opposite side walls of inboard casing portion 192 by the respective anti-friction bearing means 239 and 240. The outboard end of the latter shaft has a pinion gear 241 suitably mounted thereon and constrained for rotation with the shaft. Said pinion gear is disposed for continuous meshing engagement with an internal ring gear 242 mounted by splines 243 on a shaft 244 the inboard end of which is journalled by anti-friction bearing means 245 mounted in a side wall of transmission inboard casing portion 192, while the outboard end of said shaft is journalled by anti-friction bearing means 246 mounted in transmission outboard casing portion 193. The outboard end of shaft 244 includes an integrally fashioned wheel hub 247 having a flange portion 248 thereon that seatingly mates with a central inner portion of guide wheel flange 249 and is detachably affixed thereto by suitable means such as the bolts or cap screws 250. A nut 251 threaded on the inboard end of shaft 244 cooperates with a washer 252 in close-fitting contact with bearing 245, and with a shoulder 253 on hub 247 in close-fitting contact with bearing 246 in order to retain said latter shaft against axial displacement.

The shifter fork mechanism 238, as best seen in FIGURES 10, 12, 13 and 15, includes a fork-like body member 254 with yoke-like arms 255, 255 extending outwardly therefrom with said arms dimensioned to fit with limited axial clearance into the annular recess or channel 237 provided between gears 236a and 236b of cluster 236. The fork body member 254 has projecting outwardly in one direction therefrom a guide rail member 256 that is slidably received in an aperture 257 in a wall portion of inboard casing 192, and another guide rail member 258 extending outwardly from an oppositely facing surface of said fork body member for slidable accommodation in an aperture 259 in another wall portion of inboard casing 192. Said guide rail members are positioned at one end of each thereof in split apertures 260 and 261 provided in said body member and are detachably secured in place by suitable means such as the bolts 262 which simultaneously tightly clamps both said guide rails within their respective apertures.

Rail member 258 is provided with a plurality of axially spaced detent grooves or recesses 263, one for each operating condition of the proximate transmission, with said grooves dimensioned to receive a ball detent 264, in turn, disposed in an aperture 265 in said inboard casing portion and pressed selectively into one of said grooves by a coil spring 266 retained in place by a threaded closure plug 267. The outer end of guide rail 258 projects outwardly through an aperture 268 in a wall of said inboard casing portion and is covered with a dome-shaped closure cap 269 that may be detachably wedge-fitted into place in said aperture.

The shifter fork body member 254 has an outwardly opening recess 270 therein adapted to receive a ball-shaped end 271 of an actuating arm 272 whose opposite end is mounted as by the splines 273 on the lower end of a post or spindle 274 dimensioned for rotational journalling fit within the king pin tubular member 201, while said actuating arm extends through and for rotation within opening 203a of bridging member 203 of king-pin assembly 200.

The outwardly extending upper end of spindle 274 has mounted thereon for rotation therewith a shifter arm 275 which may be rotationally secured to said spindle, by any suitable means such as an interlocking key 276 positionable in mating axially extending slots or recesses in the respective arm and spindle, while a set screw 277 threadably extending through said shifter arm to said spindle may be provided to prevent accidental axial displacement of said arm. Shifter arm 275 normally extends parallel to the axis of rear axial assembly 164 and the opposite or inboard end thereof is pivotally connected to a stud or pin 278 suitably secured to and depending from the lower surface of a spring-loaded link structure 279. Said latter link structure which is resiliently yieldable includes a closed-ended elongated container 280 having suitable apertures in each end thereof that slidably accommodate a rod-like link member 281 extending therethrough. Axially spaced washers 282, 283 on said rod-like link member are held on one side against the respective transverse pins 284, 285 fixed in said link member, and on the opposite side are adapted to engage opposite ends of a coil spring 286 circumscribing the link member in said container. Movement of said rod-like member in one direction tends to compress spring 286 from one end thereof if resistance to movement of shifter arm 275 exceeds a predetermined amount, while movement in the opposite direction tends to compress said spring from the other end thereof under a similar resistance to movement of the shifter arm. This resiliently yieldable facility or feature provided by said spring-loaded link structure is particularly useful when shifting gears and the teeth of the gears to be meshed are not in alignment or readily engageable relationship. In which case the compressed spring 286 continues to urge shifter arm 275 to the selected position so that as soon as one of said gears moves sufficiently to permit meshing engagement of the desired gears such will be accomplished under the urging of said spring. One end of rod member 281 projects freely outwardly of container 280 while the opposite end is suitably affixed to a U or bail-shaped member 287 the arms of which are pivotally connected at 288 to a block 289 disposed between said arms. A large-headed pin 290 pivotally positioned with the shank thereof extending through block 289 also has a portion of said shank extending through the universal joint indicated generally at 291. One bail member 292 of said universal joint is fixed to a stub shaft 293 journalled by a bearing 294 affixed, by suitable detachable means such as the cap screws 295, to the inboard casing portion 192, while the other cooperating bail member 296 of said universal joint is fixed to a member, as illustrated outer member 167a, of the telescoping tubular control linkage 167, with an inner telescoping member 167b thereof having its outwardly projecting end fixed to a similar bail member 296a of a universal joint 291a proximate the transversely spaced and oppositely disposed guide wheel transmission unit. Another bail member 292a of said latter universal joint is similarly fixed to a stub shaft 293a journalled in a bearing 294a detachably mounted on the opposite transmission casing. It will be understood, of course, that similar actuating and shifter control elements will be provided for the oppositely disposed transmission unit and that like elements whenever shown will carry the same reference numerals but with the suffix "a" added thereto.

It will be recognized that as arranged each universal joint mechanism is, in effect, a double universal joint which permits freedom of rotational movement of the telescoping linkage 167 and shifting of the associated transmission units when the guide wheels are not parallel, or when they are tilted about a horizontal axis toward or away from one another. This arrangement, in effect, compensates for the different turning radii of the guide wheels when the vehicle is being turned. Such arrangement, also, permits freedom of movement of the spring-loaded linkage mechanism relative to the telescoping linkage when movements thereof are brought about by tilting of the guide wheel structures.

The telescoping cross-shaft linkage 167 is rotatable about the longitudinal axis thereof to effect a shifting of the gears in the respective guide wheel transmissions as will presently be further explained. As illustrated, the inner and outer tubular elements of said telescoping control linkage comprises substantially square-shaped tubular members so that said members are constrained for rotational movement with one another. It will be appreciated, of course, that other well-known interlocking means may be employed to accomplish such telescoping and concomitant rotation and hence it is desired the present invention not be limited to the specific means disclosed for this purpose. A slotted arm 297 positioned around the outer telescoping tubular member 167a is fixedly secured thereto, by suitable means such as brazing, welding or the like as indicated at 298, and the free end of said arm is pivotally connected at 299 to one end of a rod or link 300. Pivotally mounted at 301 on the frame 15 is a bell-crank 302 one arm of which is pivotally connected at 303 to the opposite end of rod 300, while the other arm of said bell-crank is pivotally connected at 304 to one end of a rod 305. The opposite end of rod 305 pivotally connects at 306 to a crank arm 307 the opposite end of which crank arm is suitably secured to an elongated shaft member 308 and constrained for rotation therewith, while bearings means 309 and 310 supportably carried by the vehicle frame 15 may provide journalling means for said elongated shaft member. The forward end of shaft 308 has a reduced section portion 309 thereon which provides the support pivot means 141 for bell-crank 140, while the bell-crank 140a also mounted on said reduced section portion is secured thereto by a pin 311 which constrains the latter bell-crank for rotation with said shaft. Now, when bell-crank 140 is actuated by the vehicle operator it rotates freely on shaft 308 without affecting the shift control condition of the guide wheel transmission units, but when bell-crank 140a is rotated the shaft 308 rotates therewith, and does affect the shift control for the guide wheel transmission units.

*Operation*

In operation fluid under pressure is supplied to the main wheel transmission motors through the indicated directional control valve 27 (FIGURE 7) and the exhaust or outflow therefrom is passed through relief valve 181 to the downstream directional control valve 178 and thereafter at greatly reduced pressure to the guide wheel transmission motors before returning to fluid pump 29. Under normal operating conditions it is intended that the main traction wheels provide the entire drive for the vehicle with the guide wheels functioning primarily as steerable wheels for the vehicle. Hence the fluid flow, and, incident thereto, the torque-transmitting and linear driving relationship established between the main and guide wheel transmissions in first and second gear speed ratios of the main transmissions is such that while the main wheels are providing the necessary drive for the vehicle the guide wheels are functioning primarily as followers with the hydraulic motors associated with the respective guide wheels functioning as pumps for displacing the fluid flowing therethrough back to the fluid pressure source rather than as motors and providing drive for the vehicle. This condition is sometimes spoken of in terms of "lag" to the extent of saying the linear drive of the guide wheels "lags" that of the main traction wheels. However, when one or both of the main traction wheels slips or spins as a result of some ground condition encountered while said main transmissions are in the first or second gear speed ratios the guide wheels immediately assume the burden of providing a portion of the drive for the vehicle, in which case they can no longer be said to lag the main wheels. With the main transmission units in their third gear speed ratio the guide wheel transmissions will be in neutral and hence the guide wheels will free wheel and function only as followers and do not aid in providing drive for the vehicle. By way of example but not limitation, it is believed that the pressure in the circuit through the main wheel motors may reach 5000 p.s.i. but it is proposed that the pressure in the circuit through the guide wheel motors be limited to 2000 p.s.i.

When it is desired to operate the vehicle in the first gear ratio or range the universally mounted operator's gear shift control handle 150 is shifted rearwardly to the position indicated 1 in the slotted gear shift pattern (FIGURE 9) which movement lifts or raises link 143a and thus pivots lower bell-crank 140a, counterclockwise as viewed in FIGURE 1, about its support pivot 142a thus causing the link 122a to move axially to the right, as seen in FIGURE 1, carrying with it pivotally connected lever 127a and causing shafts 106, 106 and attached shifter forks 64, 64 to be moved outwardly relative to the center of the vehicle as viewed herein. Such movement effects meshing engagement of gears 62a, 62a with the respective gears 67, 67 and thus conditions the main wheel transmissions for the first gear speed ratio or range therethrough. To operate in the second gear speed ratio or range the control handle 150 is shifted forwardly to the position indicated 2 in the slotted gear shift pattern (FIGURE 9) whereupon link 143a is moved downwardly causing bell-crank 140a to pivot clockwise and move link 122a axially to the left as viewed in FIGURE 1. This causes shafts 106, 106 and attached shifter forks 64, 64 to be moved inwardly relative to the central longitudinal axis of the vehicle as viewed herein and effects a meshing engagement of gears 62b, 62b with the respective ring gears 65a, 65a and thereby conditions both main wheel transmissions for the second gear speed ratio or range therethrough. For the third gear speed ratio or range the gear shift control handle 150 is shifted to the position indicated 3 in the slotted-gear shift pattern (FIGURE 9) whereupon link 143 is moved forwardly causing lower bell-crank 140 to pivot clockwise and thus move link 122 axially to the left as viewed in FIGURE 1. This causes shafts 93, 93 and attached shifter forks 55, 55 to be moved inwardly toward the center of the vehicle as viewed herein and effects a meshing engagement of gears 53, 53 with the respective gears 65b, 65b and thereby conditions the main wheel transmissions for the third gear speed ratio or range therethrough.

It will be readily apparent, therefore, that when gear shift control handle 150 is moved by the operator to condition the main transmission units for the first gear speed ratio or range the interconnecting shift control linkage 168 and 167 will simultaneously shift the guide wheel transmission units to the low range thereof, and when the main transmission units are conditioned for the second gear ratio thereof the guide wheel transmission units will simultaneously be conditioned for the high range thereof, but when the main units are conditioned for their third gear range the guide wheel units will remain in neutral and be available to free wheel.

During normal operating conditions when the guide wheel motors lag the main wheel motors the pressure on the inlet or pressure side of the guide wheel motors is considerably reduced thus permitting the pressure on the outlet side of said motors to cause anti-cavitation valve 183 to open and permit a limited flow of fluid to recirculate through this valve from the outlet to the inlet side of these motors. However, when the guide wheels begin to aid in propelling the vehicle the inlet line to the guide wheel motors is again fully pressurized and the anti-cavitation valve is closed.

In shifting to obtain various speed gear ratios through the transmissions the operator moves control handle 150 to the desired ratio as indicated by the gear-shift pattern of FIGURE 9 whereupon, as previously explained, the main and guide wheel transmissions are simultaneously shifted for the first and second gear ratios of said main transmissions but in the third speed thereof the guide wheel transmissions are retained in neutral and are available to free-wheel.

The directional control valves 27 and 178 are manually operable to reverse the direction of flow of fluid through the respective motors so as to obtain reverse drive operation of the vehicle when desired. Likewise, these valves as arranged will permit individual control of the main traction wheel motors a feature which may be very useful in rice fields or hillside operations. It will be understood, of course, that suitable well-known and conventional means (not shown) may, if desired, be provided for detachably inter-locking the operations of both said directional control valves without deviating from or interfering with any of the inventive concepts of the present invention.

It will now be apparent that a novel, improved and simplified speed-varying power drive means together with control linkage therefor for a self-propelled agricultural combine-type vehicle has been shown and described, and it is to be understood that changes may be made in the construction without departing from the spirit of the invention or the scope thereof as defined in the appended claims:

What is claimed is:

1. In an agricultural combine vehicle having an operator's station, a pair of laterally spaced-apart main traction wheels supportably mounted at one end of the vehicle, and a pair of laterally spaced-apart steerable guide wheels supportably mounted at the other end of the vehicle, a four-wheel drive combination, comprising: a plurality of change-speed transmissions operatively connected to and mounted in part at least one within each wheel; a plurality of fluid pressure drive motors mounted on and operatively connected one to each of said transmissions for driving the associated wheel; a fluid pressure source; fluid conduit means interconnecting said fluid pressure drive motors with said fluid pressure source and including directional flow control valves for all said motors; each of said change-speed transmissions associated with a main traction wheel being conditionable for a plurality of speed ratio positions plus a neutral position, and each of said change-speed transmissions associated with a guide wheel being conditionable for one less plurality from that of said main wheel transmissions of speed ratio positions plus a neutral position; and having the relationship of the torque-transmitting capacities of the transmissions of the main wheels and guide wheels in the various speed ratios of each thereof arranged so that normally propulsion of the vehicle is effected solely through the main wheels while the guide wheels provide no propulsive force therefor, but further having said guide wheels while said main transmissions are in certain of the selected speed ratio positions thereof operative for providing when one or more of the main wheels slip with a consequent reduction of traction thereof limited propulsive force for aiding in propelling the vehicle.

2. In a combine-type agricultural vehicle having an operator's station, a pair of laterally spaced-apart main traction wheels supportably mounted at a forward end of the vehicle, and a pair of laterally spaced-apart steerable guide wheels supportably mounted at a rearward end of the vehicle, a four-wheel drive combination comprising: a plurality of change-speed transmissions operatively connected to and mounted in part at least one within each wheel; a plurality of fluid pressure drive motors mounted on and operatively connected one to each of said transmissions for driving the associated wheel; a fluid pressure source; fluid conduit means interconnecting said fluid pressure drive motors with said fluid pressure source and including individually operable directional flow control valves for said motors with said main traction wheel motors additionally being operable independently of one another; each of said change-speed transmissions associated with a main traction wheel being conditionable for a plurality of speed ratio positions plus a neutral position, and each of said change-speed transmissions associated with a guide wheel being conditionable for one less a pluralty from that of said main wheel transmissions of speed ratio positions plus a neutral position; and having the relationship of the torque-transmitting capacities of the transmissions of the main wheels and guide wheels in various speed ratios of each thereof arranged so that normally propulsion of the vehicle is effected solely through the main wheels while the guide wheels provide no propulsive force therefor, but further having while said main transmissions are in certain of the selected speed ratio positions thereof said guide wheels operative for providing when one or more of the main wheels slip with a consequent reduction of traction thereof limited propulsive force for aiding in propelling the vehicle.

3. In an agricultural combine vehicle having an operator's station, a pair of laterally spaced-apart main traction wheels supportably mounted at one end of the vehicle, and a pair of laterally spaced-apart steerable guide wheels supportably mounted at the other end of the vehicle, a power wheel drive combination, comprising: a plurality of change-speed transmissions operatively connected to and mounted in part at least one within each wheel; a plurality of fluid pressure drive motors mounted on and operatively connected one to each of said transmissions for driving the associated wheel; a fluid pressure source; fluid conduit means interconnecting said fluid pressure drive motors with said fluid pressure source and including directional flow control valves for all said motors and with the valve for said guide wheel motors connected downstream of the valves for said main traction wheel motors; said guide wheel motors being connected in parallel flow relationship; each of said change-speed transmissions associated with a main traction wheel being conditionable for a plurality of speed ratio positions plus a neutral position, and each of said change-speed transmissions associated with a guide wheel being conditionable for one less a plurality from that of said main wheel transmissions of speed-ratio positions plus a neutral position; and having the linear driving relationship between the main wheels and the guide wheels in various speed ratio positions of the respective transmissions thereof arranged so that normally when the main traction wheels are propelling the vehicle the guide wheel motors function as pumps and do not provide drive to the said guide wheels, but further having while said main wheel transmissions are in certain of the selectable speed ratio positions thereof said guide wheel motors operative as motors to provide power drive to said guide wheels when one or more of the main wheels slip with a consequent reduction of traction thereof whereby limited propulsive force is provided for aiding in propelling the vehicle.

4. In an agricultural vehicle having an operator's station, a pair of laterally spaced-apart main traction wheels supportably mounted at one end of the vehicle, and a pair of laterally spaced-apart steerable guide wheels supportably mounted at the other end of the vehicle, a power wheel drive combination, comprising: a plurality of change-speed transmissions operatively connected to and mounted in part at least one within each wheel; a plurality of fluid pressure drive motors mounted on and operatively connected one to each of said transmissions for driving the associated wheel; a fluid pressure source; fluid conduit means interconnecting said fluid pressure drive motors with said fluid pressure source and including directional flow control valves for all said motors and having the valve for said guide wheel motors connected downstream of the valves for said main traction wheel motors; said guide wheel motors being connected in parallel flow relationship; each of said change-speed transmissions associated with a guide wheel tion wheel being conditionable for a plurality of speed ratio positions plus a neutral position, and each of said change-speed transmissions associated with a guide wheel being conditionable for one less a plurality from that of said main wheel transmissions of speed-ratio positions plus a neutral position; and having the fluid flow relationship between the motors associated with the transmissions in the main wheels and the motors associated with the transmissions in the guide wheels proportioned so that normally when the traction wheels are propelling the vehicle in certain selected speed ratios of the transmissions thereof the guide wheel motors function as pumps and do not provide vehicle drive by way of said guide wheels, but wherein while said main wheel transmissions are in certain of the selected speed ratios thereof and one or more of the main traction wheels slip and thus provide only limited drive for the associated wheel the guide wheel motors thereupon operate as motors to provide power drive for aiding in propelling the vehicle.

5. In an agricultural vehicle having an operator's station, a pair of laterally spaced-apart main traction wheels supportably mounted at a forward end of the vehicle, and a pair of laterally spaced-apart steerable guide wheels supportably mounted at a rearward end of the vehicle, a power wheel drive combination, comprising: a plurality of change-speed transmissions operatively connected to and mounted in part at least one within each wheel; a plurality of fluid pressure drive motors mounted on and operatively connected one to each of said transmissions for driving the associated wheel; a fluid pressure source; fluid conduit means interconnecting said fluid pressure drive motors with said fluid pressure source and including directional flow control valves for all said motors and with the valve for said guide wheel motors connected downstream of the valves for said main traction wheel motors; said guide wheel motors being connected in parallel flow relationship; each of said change-speed transmissions associated with a main traction wheel being selectively conditionable in a first, second, third or neutral position, and each of said change-speed transmissions associated with a guide wheel being selectively conditionable in a low, high or neutral position; and having the fluid flow relationship between the motors associated with the transmissions in the main wheels and the motors associated with the transmissions in the guide wheels proportioned so that normally with said main traction wheels propelling the vehicle in the first or second positions of the main transmissions thereof the guide wheel motors function as pumps and do not provide vehicle drive by way of said guide wheels, but being further arranged so that when said main wheel transmissions are in the first or second positions thereof with said guide wheel transmissions in the low or high positions thereof and one or more of the main traction wheels slip and thus provide only limited drive for the latter wheel the guide wheel motors thereupon operate as motors to provide power drive for aiding in propelling the vehicle.

6. In an agricultural vehicle having an operator's station, a pair of laterally spaced-apart main traction wheels supportably mounted at one end of the vehicle, and a pair of laterally spaced-apart steerable guide wheels supportably mounted at the other end of the vehicle, a power wheel drive combination, comprising: a plurality of change-speed transmissions operatively connected to and mounted in part at least one within each wheel; a plurality of fluid pressure drive motors mounted on and operatively connected one to each of said transmissions for driving the associated wheel; a fluid pressure source; fluid conduit means interconnecting said fluid pressure drive motors with said fluid pressure source and including directional flow control valves for all said motors and with the valve for said guide wheel motors connected downstream of the valves for said main traction wheel motors; said guide wheel motors being connected in parallel flow relationship; each of said change-speed transmissions associated with a main traction wheel being conditionable for a plurality of speed ratio positions plus a neutral position, and each of said change-speed transmissions associated with a guide wheel being conditionable for one less a plurality from that of said main wheel transmissions of speed-ratio positions plus a neutral position; and having the fluid flow relationship between the motors associated with the transmissions in the main wheels and the motors associated with the transmissions in the guide wheels proportioned so that normally when the main traction wheels are propelling the vehicle in either one of two selected speed ratios of said plurality of speed-ratios of the transmissions thereof the guide wheel motors function as pumps and do not provide vehicle drive by way of said guide wheels, and when said main traction wheels are propelling the vehicle in another selected speed ratio of said plurality of speed-ratios of the transmissions thereof the guide wheels free-wheel with the associated transmissions thereof in neutral, but wherein while said main wheel transmissions are in either one of said two selected speed ratios thereof and one or more of the main traction wheels slip and thus provide only limited drive for the associated wheel the guide wheel motors thereupon operate as motors to provide power drive for aiding in propelling the vehicle.

7. In an agricultural combine-type vehicle having an operator's station, and a pair of laterally spaced-apart main traction wheels supportably mounted at one end of the vehicle and a pair of laterally spaced-apart steerable guide wheels supportably mounted at the other end of the vehicle, a four-wheel drive combination, comprising: a plurality of change-speed transmissions operatively connected to and mounted in part at least one within each wheel; a plurality of fluid pressure drive motors mounted one on each of said transmissions for driving the associated wheel; a fluid pressure source; fluid conduit means interconnecting said fluid drive motors with said fluid pressure source and including directional flow control valves for all said motors; each of said change-speed transmissions associated with a main traction wheel being conditionable for a plurality of speed-ratio positions plus a neutral position, and each of said change speed transmissions associated with a guide wheel being conditionable for one less plurality from that of said main wheel transmissions of speed ratio positions plus a neutral position; and interconnected linkage means extending between and operatively connected to all said transmissions and an operator's station and actuable for simultaneously conditioning all said transmissions for certain of the predetermined positions thereof.

8. In an agricultural combine vehicle having a generally longitudinal support structure, an operator's station, and a pair of laterally spaced-apart main traction wheels and a pair of laterally spaced-apart steerable guide wheels, the combination comprising: a plurality of change-speed transmissions operatively connected to and mounted in part at least one each within an associated wheel; a plurality of fluid pressure drive motors mounted one on each of said transmissions for driving the associated wheel; a fluid pressure source; fluid conduit means interconnecting said fluid drive motors with said fluid pressure source and including directional flow control valves for all said motors; each of said change-speed transmissions associated with a main traction wheel being conditionable for a plurality of speed-ratio positions plus a neutral position, and each of said change-speed transmissions associated with a guide wheel being conditionable for one less plurality from that of said main wheel transmissions of speed-ratio positions plus a neutral position; interconnected linkage means extending between and operatively connected to all said transmissions and an operator's station and actuable for simultaneously conditioning all said transmissions for certain of the predetermined positions thereof; first axle means fixedly mounted on said longitudinal support structure and supportably mounting said main traction wheels at the forward end of the vehicle, and second axle means fixedly mounted on said longitudinal support structure and supportably mounting said guide wheels at the rear end of the vehicle; said guide wheel transmissions being pivotally supported at opposite ends of said second axle means on pivots forwardly off-set from a perpendicular centerline of the respective wheels whereby when said latter wheels are turned as for steering the rear end of said vehicle is moved selectively to one side or the other of a central longitudinal axis of the vehicle.

9. The invention according to claim 8 and further characterized in that portions of said interconnected linkage means extends through portions of the pivots supporting said guide wheels without interfering with pivotal movements of said guide wheels.

10. In an agricultural vehicle having an operator's station, and a pair of laterally spaced-apart main traction wheels supportably mounted at one end of the vehicle and a pair of laterally spaced-apart steerable guide wheels supportably mounted at the other end of the vehicle, a four-wheel drive system, comprising: a plurality of change-speed transmissions operatively connected to and mounted in part at least one within each wheel, and a plurality of fluid drive motors mounted one on each of said transmissions for driving the associated wheel; a fluid pressure source, and fluid conduit means including flow control valve means interconnecting said fluid drive motors with said fluid pressure source; interconnected linkage means extending between all said transmissions and an operator's station; each of said transmissions associated with a main traction wheel being conditionable in three speed ratios and a neutral position, and each of said transmissions associated with a guide wheel being conditionable in two speed ratios and a neutral position; said linkage means being actuable so that in a first position, said main wheel transmissions are conditioned for a first speed ratio thereof and concomitant therewith said guide wheel transmissions are conditioned for a first speed ratio thereof, and in a second position said main wheel transmissions are conditioned for a second speed ratio while concomitant therewith said guide wheel transmissions are conditioned for a second speed ratio thereof, and in a third position said main wheel transmissions are conditioned for a third speed ratio while concomitant therewith said guide wheel transmissions are conditioned for neutral, and in a fourth position wherein said main wheel transmissions and said guide wheel transmissions are all conditioned for neutral.

11. In an agricultural combine vehicle having an operator's station, and a pair of laterally spaced-apart main traction wheels supportably mounted at one end of the vehicle and a pair of laterally spaced-apart steerable guide wheels supportably mounted at the other end of the vehicle; a four-wheel drive assembly, comprising: a plurality of change-speed gear transmissions operatively connected to and mounted in part at least one within each of said wheels; each of said change speed gear transmissions associated with a main traction wheel being conditionable in a selected one of a plurality of speed ratio positions or in a neutral position, and each of said change-speed gear transmissions associated with a guide wheel being conditionable in a selected one of one less plurality of speed ratio positions from that of said main wheel transmissions or in a neutral position; interconnected linkage means extending between all said transmissions and the operator's station and actuable for simultaneously conditioning said transmissions for certain of the predetermined selectable positions thereof; a plurality of fluid drive motors mounted on and operatively connected one to each said transmission for driving the vehicle wheel associated therewith; a fluid pressure source; fluid control means interconnecting said fluid drive motors with said fluid pressure source for controlling fluid flow to the respective motors; said fluid control means including conduits interconnecting said motors with said source, a first directional control valve for controlling direction of fluid flow to said main traction wheel motors, and a second directional control valve interposed downstream of said first valve for controlling the direction of fluid flow to said guide wheel motors; and uni-directional flow anticavitation valve means communicatively interconnected between pressure and return flow conduits of said guide wheel motors whereby a limited amount of downstream fluid from said guide wheel motors is allowed to recirculate to an upstream side of said guide wheel motors when the flow of fluid to said latter motors lags the displacement of fluid from said motors.

12. The invention according to claim 11 and further characterized in that said anti-cavitation valve means is interconnected between the pressure and return conduits of the guide wheel motors downstream from said second directional control valve.

13. The invention according to claim 11 but further characterized in that said anti-cavitation valve means includes a perforate baffle member and a spring urging said member in one direction in a bore formed within a valve casing and having openings at opposite ends of the casing communicating with said pressure and return conduits, said baffle being operative in one position for closing off one of said openings to restrict flow therethrough in one direction and in other positions to permit limited flow therethrough in an opposite direction.

14. In an agricultural vehicle having a frame, forwardly and rearwardly disposed axle assemblies each supportably mounted on the frame, a plurality of change-speed transmissions including gearing therein operable to selectively provide any one of a plurality of gear speed ratio drives therethrough and mounted one at each end of each axle assembly, main traction wheels mounted one on each of the respective transmissions mounted on said forward axle assembly, guide wheels mounted one on each of the respective transmissions mounted on said rearward axle assembly, the combination comprising, first motion-transmitting control linkage interconnecting transmissions associated with said main traction wheels, second motion-transmitting control linkage interconnecting transmission associated with said guide wheels, third motion-transmitting control linkage interconnecting said first and second control linkages for simultaneous operation thereof, handle operating means disposed for actuation by a vehicle operator and connected for operation of said third control linkage, said third control linkage being operative responsive to actuation of said control handle for selecting simultaneously certain of the gear speed ratios available through each of said change-speed transmissions.

15. The invention according to claim 14 and further characterized in that said second motion-transmitting control linkage includes telescoping elements which extend transversely of the vehicle to accommodate variations in transverse spacing of portions of said guide wheels.

16. In an agricultural vehicle having a frame, a forwardly disposed axle assembly supportably mounted on the frame, a rearwardly disposed axle assembly supportably mounted on the frame, a plurality of change-speed transmissions mounted one at each end of said axle assemblies, main traction wheels mounted one on each of the transmissions associated with said forward axle assembly, guide wheels mounted one on each of the transmissions associated with said rearward axle assembly, the combination, comprising: first motion-transmitting control linkage interconnecting transmissions associated with said main traction wheels, and including direction reversing means whereby opposite ends of said control linkage move in opposite directions upon movement of said linkage; second motion-transmitting control linkage interconnecting transmissions associated with said guide wheels; third motion-transmitting control linkage interconnecting said first and second control linkages for operation thereof; operating means carried by the vehicle, and including a control handle disposed for manual actuation by a vehicle operator; motion-transmitting means interconnectable between said handle operating means and said third motion-transmitting control linkage, including means for translating movements of the handle into selected movement of said control linkages whereby certain pre-determined speed ratios are selected simultaneously for the said change-speed transmissions.

17. In an agricultural vehicle having a frame, forwardly and rearwardly disposed axle assemblies each supportably mounted on the frame, a plurality of change-speed transmissions mounted one at each end of said axle assemblies, main traction wheels mounted one on each of the transmissions associated with said forward axle assembly, guide wheels mounted one on each of the transmissions associated with said rearward axle assembly, the combination comprising: said guide wheel transmissions being pivotally supported at opposite ends of said rearward axle assembly on pivots forwardly offset from a perpendicular centerline of the respective wheels whereby when said guide wheels are turned as for steering the rear end of said vehicle is moved selectively to one side or the other of a central longitudinal axis of the vehicle; first motion-transmitting control linkage interconnecting transmissions associated with said main traction wheels, second motion-transmitting control linkage interconnecting transmissions associated with said guide wheels, and having portions of said second control linkage extending axially through portions of the pivots supporting said guide wheel transmissions without interfering with pivotal movements of said guide wheels, third motion-transmitting control linkage interconnecting said first and second control leakages for operation thereof, operating means carried by the vehicle and including a control handle disposed for manual actuation by a vehicle operator, motion-transmitting means interconnectable between said handle operating means and said third motion-transmitting control linkage including means for translating movements of the handle into selected movements of said control linkages whereby certain pre-determined speed ratios are selected simultaneously for the said change-speed transmissions.

18. In an agricultural vehicle having a frame, forwardly and rearwardly disposed axle assemblies each supportably mounted on the frame, a plurality of change-speed transmissions including gearing therein operable to selectively provide any one of a plurality of gear speed ratio drives therethrough and mounted one at each end of each axle assembly, main traction wheels mounted one on each of the respective transmissions mounted on said forward axle assembly, and guide wheels mounted one on each of the respective transmissions mounted on said rearward axle assembly, the combination comprising: first and second motion-transmitting control linkages respectively interconnecting transmissions associated with said main traction wheels and transmissions associated with said guide wheels; said second motion-transmitting control linkage including telescoping means extendable and contractable transversely of the vehicle to accommodate variations in transverse spacing of portions of said guide wheels, and universal joint means pivotally mounted one on each proximate transmission and having opposite ends of said telescoping means affixed one to a proximate one of said universal joint means at a point opposite the pivotal mounting of said joint, and resiliently yieldable link means interposed in said control linkage between each said universal joint and a respective transmission and yieldable upon encountering a predetermined resistance to the conditioning of an associated transmission for a selected speed ratio drive therethrough; third motion-transmitting control linkage interconnecting said first and second control linkages for simultaneous operation thereof; handle operating means disposed for actuation by a vehicle operator and connected for operation of said third control linkage; said third control linkage being operative responsive to actuation of said control handle for selecting simultaneously certain of the gear speed ratio drives available through said change-speed transmissions.

19. In an agricultural vehicle having a generally longitudinal support structure, an operator's station, forwardly and rearwardly disposed axle assemblies each supportably mounted on said support structure, a pair of main traction wheels supportably carried one each at opposite ends of said forward axle assembly, a pair of guide wheels supportably carried one each at opposite ends of said rearward axle assembly, the combination, comprising: a plurality of change-speed transmissions operatively connected to and mounted in part at least one within each associated wheel and interposed between the support carrying the wheel on the proximate axle and the respective wheel; a plurality of fluid pressure drive motors mounted one on each of said transmissions for driving the associated wheel; a fluid pressure source; fluid conduit means interconnecting said fluid drive motors with said fluid pressure source and including directional flow control valves for all said motors; each of said change-speed transmissions associated with a main traction wheel being conditionable for a plurality of speed-ratio positons plus a neutral position, and each of said change-speed transmissions associated with a guide wheel being conditionable for one less plurality from that of said main wheel transmissions of speed-ratio positions plus a neutral position; said guide wheel transmissions being pivotally supported on said rearward axle assembly on pivots forwardly offset from a perpendicular center line of the respective wheels whereby when said guide wheels are turned as for steering the rear end of said vehicle is moved selectively to one side or the other of a central longitudinal axis of the vehicle; first motion-transmitting control linkage interconnecting transmissions associated with said main traction wheels; second motion-transmitting control linkage interconnecting transmissions associated with said guide wheels, and having portions of said latter linkage extending through the pivots supporting said guide wheel transmissions without interfering with pivotal movements of the associated guide wheels; third motion-transmitting control linkage interconnecting said first and second control linkages for operation thereof; operating means carried by the vehicle and including a control handle disposed for actuation by a vehicle operator; motion-transmitting means interconnectable between said handle operating means and said third motion-transmitting control linkage including means for translating movements of the handle into selected movements of said control linkages whereby certain pre-determined speed-ratios of said transmissions are selected simultaneously.

20. In an agricultural vehicle having an operator's station, a pair of laterally spaced-apart main traction wheels supportably mounted at a forward end of the vehicle, and a pair of laterally spaced-apart steerable guide wheels supportably mounted at a rearward end of the vehicle, a power wheel drive combination, comprising: a plurality of change-speed transmissions operatively connected to and mounted in part at least one within each wheel; a plurality of fluid pressure drive motors mounted on and operatively connected one to each of said transmissions for driving the associated wheel; a fluid pressure source; fluid conduit means interconnecting said fluid pressure drive motors with said fluid pressure source and including directional flow control valves for all said motors, and having the valve for said guide wheel motors connected downstream of the valves for said main traction wheel motors; said guide wheel motors being connected in parallel flow relationship; each of said change-speed transmissions associated with a main traction wheel being selectively conditionable in a first, second, third or neutral position, and each of said change-speed transmissions associated with a guide wheel being selectively conditionable in a low, high or neutral position; first motion-transmitting control linkage interconnecting transmissions associated with said main traction wheels; second motion-transmitting control linkage interconnecting transmissions associated with said guide wheels; third motion-transmitting control linkage interconnecting said first and second control linkages for simultaneous operation thereof; handle operating means disposed for actuation by a vehicle operator and connected for operation of said third control linkage, and having said latter linkage operative responsive to actuation of said control handle for selecting simultaneously certain of the positions available in each of said change-speed transmissions; and having the fluid flow relationship between the motors associated with the transmissions in the main traction wheels and the motors associated with the transmissions in the guide wheels proportioned so that normally with said main traction wheels propelling the vehicle in said first or second position of the main transmissions the guide wheel motors function as pumps and do not provide vehicle drive by way of said guide wheels, but being further arranged so that when said main wheel transmissions are in the first or second positions thereof with said guide wheel transmissions in the respective low or high position thereof and one or more of the main traction wheels slip so as to provide only limited drive for the latter wheels the guide wheel motors thereupon operate as motors to provide power drive for aiding in propelling the vehicle.

References Cited by the Examiner
UNITED STATES PATENTS

| | | | |
|---|---|---|---|
| 2,384,447 | 9/1945 | Baldwin | 180—66 |
| 2,421,013 | 5/1947 | Cornwell | 180—66 X |
| 3,129,781 | 4/1964 | Stein | 180—44 |

BENJAMIN HERSH, *Primary Examiner.*

W. A. MARCONTELL, *Assistant Examiner.*